(12) United States Patent
Fontalbat et al.

(10) Patent No.: US 11,067,001 B2
(45) Date of Patent: Jul. 20, 2021

(54) TURBINE ENGINE WITH STARTER MOTOR WITH REVERSIBLE VENTILATION, AND ASSOCIATED COOLING METHOD

(71) Applicant: SAFRAN ELECTRICAL & POWER, Blagnac (FR)

(72) Inventors: Thierry Fontalbat, Balgnac (FR); Florent Challas, Balgnac (FR); Fabien Orlandini, Balgnac (FR)

(73) Assignee: SAFRAN ELECTRICAL & POWER, Blagnac (FR)

(*) Notice: Subject to any disclaimer, the term of this patent is extended or adjusted under 35 U.S.C. 154(b) by 43 days.

(21) Appl. No.: 16/634,843

(22) PCT Filed: Jul. 10, 2018

(86) PCT No.: PCT/FR2018/051736
§ 371 (c)(1),
(2) Date: Jan. 28, 2020

(87) PCT Pub. No.: WO2019/025684
PCT Pub. Date: Feb. 7, 2019

(65) Prior Publication Data
US 2020/0158021 A1  May 21, 2020

(30) Foreign Application Priority Data
Jul. 31, 2017  (FR) ...................... 1757325

(51) Int. Cl.
*F02C 7/268* (2006.01)
*F02C 7/275* (2006.01)
*F02C 7/18* (2006.01)

(52) U.S. Cl.
CPC ............ *F02C 7/275* (2013.01); *F02C 7/18* (2013.01); *F05D 2220/329* (2013.01); *F05D 2260/201* (2013.01); *F05D 2260/85* (2013.01)

(58) Field of Classification Search
CPC .. F02C 7/268; F02C 7/275; F02C 7/18; F05D 2220/329; F05D 2220/201; F05D 2260/85
See application file for complete search history.

(56) References Cited

U.S. PATENT DOCUMENTS

| | | | | |
|---|---|---|---|---|
| 5,172,543 A | * | 12/1992 | White | ............... F02C 7/275 290/38 R |
| 6,178,733 B1 | * | 1/2001 | Nelson | ............... F01D 15/10 290/2 |

(Continued)

FOREIGN PATENT DOCUMENTS

FR       2992630 A1    1/2014
WO   2013/007225 A1    1/2013

OTHER PUBLICATIONS

Written Opinion of the International Searching Authority dated Oct. 5, 2018, issued in corresponding International Application No. PCT/FR2018/051736, filed Jul. 10, 2018, 5 pages.

(Continued)

*Primary Examiner* — Steven M Sutherland
(74) *Attorney, Agent, or Firm* — Christensen O'Connor Johnson Kindness PLLC

(57) ABSTRACT

A helicopter turbomachine includes an electric starter motor configured to rotate a drive shaft, a heat sink for cooling the electric motor, and a reversible ventilation wheel driven by the electric motor. The turbomachine also includes an overrunning clutch that transmits the torque from the electric motor to the drive shaft. The electric motor is configured such that, in the first direction of rotation, the motor rotates the drive shaft and the ventilation wheel to generate an air flow through the heat sink in a direct direction, and, in the reverse direction of rotation, the motor rotates only the ventilation wheel to generate an air flow through the heat sink in a direction opposite the direct direction.

6 Claims, 1 Drawing Sheet

(56) References Cited

U.S. PATENT DOCUMENTS

| | | |
|---|---|---|
| 6,798,079 B2 * | 9/2004 | Nelson .................... F01D 25/12 |
| | | 290/2 |
| 9,664,070 B1 * | 5/2017 | Clauson ................. F02C 7/275 |
| 2014/0140872 A1 | 5/2014 | Stork et al. |
| 2015/0143950 A1 | 5/2015 | Bedrine et al. |
| 2019/0375512 A1 * | 12/2019 | Ribeiro ................. B64D 31/14 |

OTHER PUBLICATIONS

International Preliminary Report on Patentability dated Feb. 4, 2020, issued in corresponding International Application No. PCT/FR2018/051736, filed Jul. 10, 2018, 1 page.

International Search Report dated Oct. 5, 2018, issued in corresponding International Application No. PCT/FR2018/051736, filed Jul. 10, 2018, 5 pages.

Written Opinion of the International Searching Authority dated Oct. 5, 2018, issued in corresponding International Application No. PCT/FR2018/051736, filed Jul. 10, 2018, 6 pages.

* cited by examiner

TURBINE ENGINE WITH STARTER MOTOR WITH REVERSIBLE VENTILATION, AND ASSOCIATED COOLING METHOD

TECHNICAL FIELD

The invention concerns a turbine engine. In particular, the invention concerns a turbine engine of a helicopter, equipped with an electric starter motor and a system for cooling electronic components of said electric motor, and an associated cooling method.

BACKGROUND

The state of the art comprises, in particular, the French patent application published under number FR-A1-2 992 630 and the international application published under number WO-A1-2013/007225.

In the context of an operation termed hybrid, turbine engines used in helicopters can be on put on standby during the flight, then restarted if necessary. The restarting of these turbine engines is performed thanks to an electric starter motor, which drives the drive shaft of the turbine engine via an overrunning clutch, which could be disengaged after a certain rotation speed of the turbine engine. The electronic components of the electric motor are cooled by a cooling system comprising a ventilation wheel.

When the helicopter lands, the turbine engines are stopped. As there is no longer any forced dynamic or natural ventilation (since the helicopter has stopped), the temperature of the turbine engine is diffused towards the electric motor and the electronic components thereof. In particular, the temperature of the electronic components of the electric motor situated on the side of the turbine engine increases and can lead to these components being damaged. With the electric motor being connected to the turbine engine, the starting of rotation thereof to ventilate would lead to a rotation of the turbine engine which is not desirable.

The inventors have therefore sought a solution to reduce the temperature of the electronic components of the electric motor.

The invention aims to overcome at least some of the disadvantages of known turbine engines.

In particular, the invention aims to provide, in at least one embodiment of the invention, a turbine engine making it possible to reduce the heating of the electronic components of the electric starter motor of the starter system thereof during the shutdown of the turbine engine.

The invention also aims to provide, in at least one embodiment of the invention, a turbine engine using a reduced power to reduce the heating.

The invention also aims to provide, in at least one embodiment, a turbine engine of which the electronic components of the electric starter motor can be cooled without any input of electric energy by the switched-off turbine engine.

The invention also aims to provide, in at least one embodiment, a method for cooling electronic components of an electric motor of a turbine engine.

SUMMARY

To achieve this, the invention relates to a helicopter turbine engine, comprising:
at least one compressor, at least one turbine, and a drive shaft of said compressor and of the turbine, an electric starter motor comprising electronic components and configured to rotate said drive shaft,
a system for cooling electronic components of the electric motor comprising a heat sink for cooling electronic components and a ventilation wheel driven by the electric motor, characterised in that:
the ventilation wheel is a reversible ventilation wheel, adapted to generate an air flow in a first direction termed direct direction when it is rotated in a first direction of rotation, and an air flow in a direction opposite the direct direction, termed opposite direction, when it is rotated in a second direction of rotation,
the turbine engine comprises an overrunning clutch, said overrunning clutch being configured to transmit the torque generated by the electric motor to the drive shaft when the electric motor rotates according to a first direction of rotation and at a speed at least equal to the speed of the drive shaft, when the turbine engine operates and drives the drive shaft,
the electric motor is configured to, in a first operating mode and in the first direction of rotation, drive, on the one hand, the drive shaft via the overrunning clutch and, on the other hand, the ventilation wheel so as to generate an air flow through the heat sink in the direct direction, and, in a second operating mode and in the reverse direction of rotation, drive only the ventilation wheel so as to generate an air flow through the heat sink in the opposite direction.

A turbine engine according to the invention therefore makes possible, at the time of the shutdown thereof, ventilation of the electronic components of the electric starter motor by making the motor rotate in the reverse direction. Thanks to the overrunning clutch, the electric motor operating in the reverse direction does not rotate the turbine engine, but only the ventilation wheel.

The ventilation wheel is reversible and can therefore generate an air flow in both directions by changing its direction of rotation. An example reversible ventilation wheel can be found in the patent application from the applicant published under number FR-A1-3 025 665.

Thus, with a turbine engine according to the invention, it is possible to continue to cool the electric starter motor and the electronic components of the electric motor when the turbine engine has stopped, by reversing the direction of rotation of the electric motor. This is possible due to the presence of the overrunning clutch and of the reversible ventilation wheel.

Advantageously and according to the invention, in the second operating mode, the electric motor is supplied by a dedicated battery.

According to this aspect of the invention, the battery makes it possible to supply the electric motor as it is no longer supplied, neither by the turbine engine (this being switched off), nor by any equipment of the helicopter as this has stopped.

Advantageously and according to the invention, the rotation speed of the ventilation wheel in the second operating mode is configured to be less than the rotation speed of the ventilation wheel in the first operating mode.

According to this aspect of the invention, the rotation speed is reduced so as to make an effective ventilation possible and to limit the heating phenomenon of the electronic components, but by using a highly reduced operating power, the power necessary for the rotation of the wheel increasing the desired cube of the rotation speed of the ventilation wheel.

In the variant of the invention where the supply is made by a battery, the battery can thus be powerful and the capacity thereof can be reduced.

According to a preferable variant, the rotation speed of the ventilation wheel in the second operating mode is configured to be less than or equal to the rotation speed of the ventilation wheel in the first operating mode. This variant makes it possible for a good compromise between ventilation and electric consumption.

The invention also relates to a method for ventilating electronic components of an electric starter motor of a turbine engine, said turbine engine comprising:
- at least one compressor, at least one turbine, and a drive shaft of said compressor and of the turbine,
- said electric starter motor comprising electronic components and being configured to rotate said drive shaft via an overrunning clutch,
- a system for cooling electronic components of the electric motor, comprising a heat sink for cooling electronic components and a ventilation wheel driven by the electric motor, characterised in that, with the ventilation wheel being reversible, it comprises:
- a first step of driving by the electric motor, on the one hand, of the drive shaft via the overrunning clutch and, on the other hand, of the ventilation wheel so as to generate an air flow through the heat sink in a direct direction,
- a second step of driving by the electric motor, of only the ventilation wheel so as to generate an air flow through the heat sink in a direction opposite the direct direction.

Advantageously and according to the invention, the second driving step is executed after shutdown of the turbine engine.

Advantageously and according to the invention, in the second driving step, the ventilation wheel is driven in a first direction of rotation or in an opposite direction of rotation, while the rotation speed of the electric motor is less than the rotation speed of the turbine engine, and only in the opposite direction of rotation, if the rotation speed of the electric motor is greater than or equal to the rotation speed of the turbine engine.

Thus, when the electric motor does not drive the turbine engine, due to the presence of the overrunning clutch, the motor can also drive the ventilation wheel in either of the directions of rotation. When the rotation speed of the electric motor is greater than or equal to the rotation speed of the turbine engine, the overrunning clutch comes into play and the ventilator is therefore only driven in the opposite direction.

Advantageously, the turbine engine according to the invention is adapted to implement the method according to the invention.

Advantageously, the method of the invention is adapted to be implemented in a turbine engine according to the invention.

The invention also concerns a turbine engine and a method characterised in combination by all or some of the features mentioned above or below.

DESCRIPTION OF THE DRAWINGS

Other aims, features and advantages of the invention will appear upon reading the following description, given only in a non-limiting manner, and which refers to the appended figures, in which.

DETAILED DESCRIPTION

The following embodiments are examples. Although the description refers to one or more embodiments, this does not necessarily mean that each reference concerns the same embodiment, or that the features are applicable only to one single embodiment. Single features of different embodiments can also be combined to provide other embodiments. In the figures, the scales and the proportions are not strictly respected and this, for purposes of illustration and clarity.

Figure 1:
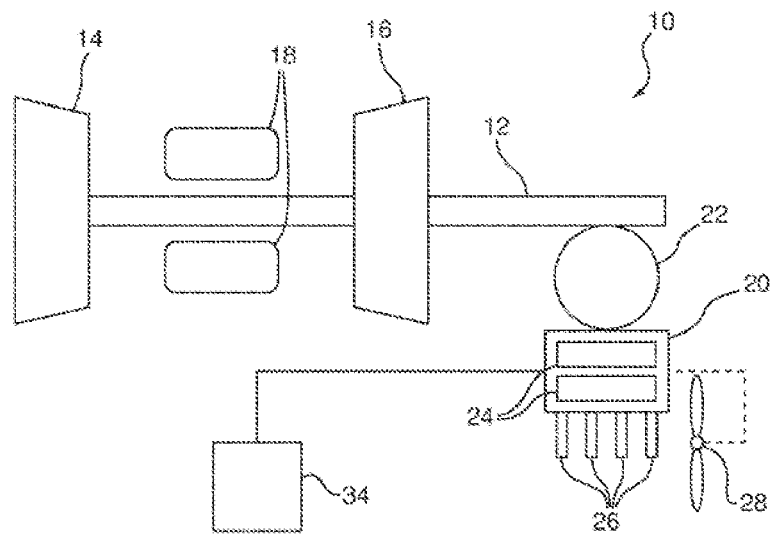
FIG. 1 is a schematic view of a turbine engine according to an embodiment of the invention.

FIG. 1 schematically represents a turbine engine 10, comprising, in a known manner, a drive shaft 12 driving a compressor 14 and a turbine 16 between which a combustion chamber 18 is located, according to a simplified representation of a turbine engine.

To make it possible for a rapid restarting of the turbine engine, for example in flight in a helicopter, when it has been put on standby, an electric starter motor 20 is connected to the drive shaft 12 via an overrunning clutch 22 (represented here schematically by a circle).

The overrunning clutch 22 has several functions: it makes it possible, on the one hand, to ensure that the electric motor only drives the drive shaft when the electric motor rotates according to a first direction of rotation and does not drive the drive shaft when the electric motor rotates according to a second direction of rotation, and on the other hand, to be disengaged from the drive shaft when this rotates at a greater speed than the electric motor.

The electric motor 20 comprises electric components 24 subjected to heating, on the one hand, by the operation thereof, and on the other hand, due to the proximity of the turbine engine generating heat during the operation thereof.

A system for cooling electronic components of the electric motor comprises a heat sink 26, here comprising several blades outside the electric motor, which are ventilated thanks to the generation of an air flow in a first direction termed direct direction by a ventilation wheel 28. The ventilation wheel 28 is directly driven by the electric motor.

The ventilation of the electric components 24 and more generally all the elements composing the turbine engine 10 is also performed partially naturally thanks to the ambient air when the turbine engine is used in a helicopter and when the helicopter is in flight and moving.

According to the invention, the ventilation wheel 28 is reversible, i.e. it is arranged to generate an air flow in the direct direction when it rotates in a first direction of rotation, and an air flow in a direction opposite the direct direction, termed opposite direction, when it rotates in a second direction of rotation.

When the turbine engine 10 is switched off, it is no longer cooled by the advancement of the helicopter and the heat that it has stored following the combustion of gases being propagated to the electronic components 24, this heat being added to the heat released by these same electronic components 24 during the operation thereof and leads to an overall heating of the electronic components 24.

Figure 2:
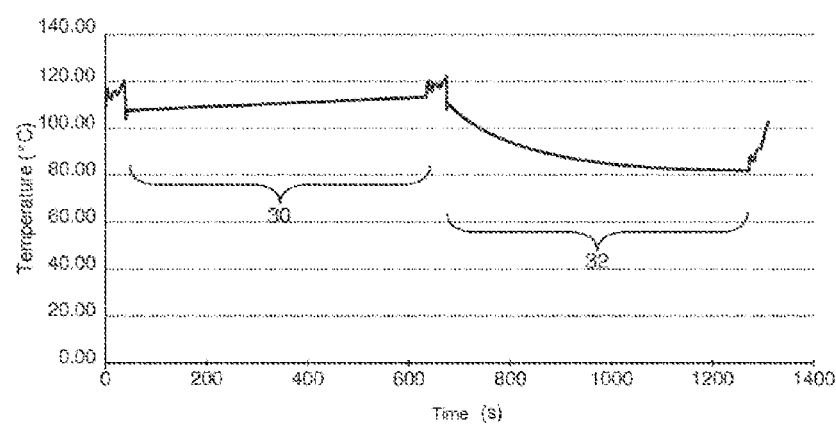
FIG. 2 is a graph representing the temperature of electronic components of an electric starter motor of a turbine engine according to the prior art, then according to an embodiment of the invention.

FIG. 2 is a graph representing the temperature over time of an electronic component over time, in particular of a diode, in a first period 30 in a prior art turbine engine and according to a prior art cooling method, and in a second period 32 in a turbine engine according to an embodiment of the invention and according to a cooling method according to an embodiment of the invention. The same curve is obtained by an IGBT transistor.

In the prior art, as the cooling system is no longer active, the temperature of the components increases during the first period 30 of time, for example here of around 107° C. to around 115° C.

In the invention, in particular in a turbine engine 10 according to the embodiment described, after the shutdown of the turbine engine, the electric motor is rotated according to the second direction of rotation. Thus, the ventilation wheel 28, which is reversible, generates an air flow in the opposite direction and thus reduces the temperature of the electronic components, for example here from 107° C. to 82° C.

Thus, according to a method according to the invention, the ventilation wheel ventilates the components during a first step when the turbine engine is in a first operating mode, in which it is switched on, and thanks to the reversible aspect thereof, also ventilates the components during a second step when the turbine engine is in a second operating mode in which it is switched off.

To limit the electric consumption and the power used by the ventilation wheel, this can be driven at a reduced speed during the second step. For example, the ventilation wheel in the first operating mode at a nominal performance:
    Rotation speed: 30000 rotations/minute,
    Air flow generated: 130 l/s,
    Power: 1 kW.

In the second operating mode, the performance can be, for example, reduced by a third, making a suitable ventilation possible with a consequent decrease of the power used:
    Rotation speed: 10000 rotations/minute,
    Air flow generated: 43l/s,
    Power: 40 W.

This is due to the fact that the power evolves to the cube of the rotation speed.

To supply the electric motor during this second operating mode, the turbine engine can comprise a dedicated battery 34.

The electric motor and the cooling system thereof are here represented in a schematic manner for more clarity. In practice, an arrangement makes it possible to arrange the electric motor and the ventilation wheel in the same axis, the electric motor comprising heat sinks on the edge thereof and the ventilation wheel generating an air flow all around the electric motor at the level of the heat sinks.

The invention claimed is:

1. A helicopter turbine engine, comprising:
    at least one compressor;
    at least one turbine;
    a drive shaft of the compressor and of the turbine;
    an electric starter motor comprising electronic components and configured to rotate said drive shaft; and
    a cooling system configured to cool electronic components of the electric motor, the cooling system comprising a heat sink configured to cool the electronic components and a reversible ventilation wheel driven by the electric motor,
    wherein:
        the ventilation wheel is configured to generate an air flow in a first direction termed direct direction when the ventilation wheel is rotated in a first direction of rotation, and an air flow in a direction opposite the direct direction, termed opposite direction, when the ventilation wheel is rotated in a second direction of rotation,
    the turbine engine further comprises an overrunning clutch configured to transmit the torque generated by the electric motor to the drive shaft when the electric motor rotates according to a first direction of rotation and at a speed at least equal to the speed of the drive shaft when the turbine engine operates and drives the drive shaft, and
    the electric motor is configured to, in a first operating mode and in the first direction of rotation, drive, on the one hand, the drive shaft via the overrunning clutch and, on the other hand, the ventilation wheel so as to generate an air flow through the heat sink in the direct direction, in a second operating mode and in the reverse direction of rotation, drive only the ventilation wheel so as to generate an air flow through the heat sink in the opposite direction.

2. The turbine engine according to claim 1, wherein in the second operating mode, the electric motor is powered by a dedicated battery.

3. The turbine engine according to claim 1, wherein the rotation speed of the ventilation wheel in the second operating mode is less than the rotation speed of the ventilation wheel in the first operating mode.

4. A method for ventilating electronic components of an electric starter motor of a turbine engine, said turbine engine comprising:
    at least one compressor, at least one turbine, and a drive shaft of said compressor and of the turbine,
    said electric starter motor comprising electronic components and being configured to rotate said drive shaft via an overrunning clutch,
    a cooling system configured to cool electronic components of the electric motor, comprising a heat sink configured to cool the electronic components and a reversible ventilation wheel driven by the electric motor,
    the method comprising:
    a first step of driving by the electric motor, on the one hand, the drive shaft via the overrunning clutch and, on the other hand, the ventilation wheel so as to generate an air flow through the heat sink in a direct direction,
    a second step of driving by the electric motor only the ventilation wheel so as to generate an air flow through the heat sink in a direction opposite the direct direction.

5. The method according to claim 4, wherein the second driving step is executed after shutdown of the turbine engine.

6. The method according to claim 4, wherein in the second driving step, the ventilation wheel is driven in a first direction of rotation or in an opposite direction of rotation, while the rotation speed of the electric motor is less than the rotation speed of the turbine engine, and only in the opposite direction of rotation if the rotation speed of the electric motor is greater than or equal to the rotation speed of the turbine engine.

* * * * *